Figure 1:
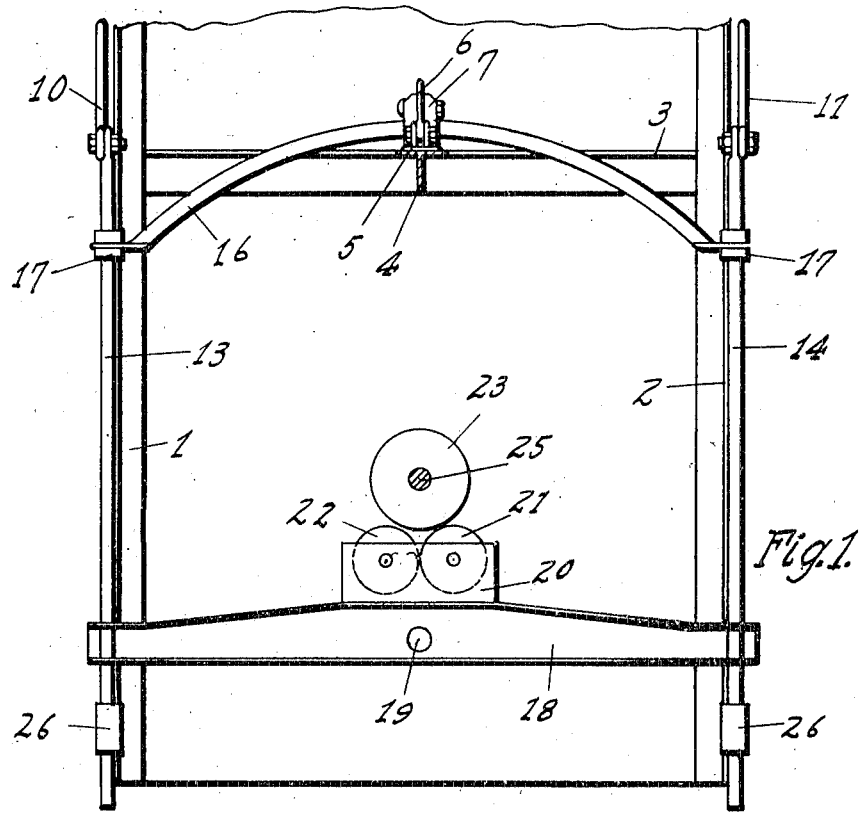

G. J. & F. E. BAKER.
CONTROL DEVICE.
APPLICATION FILED JUNE 20, 1912.

1,080,316.

Patented Dec. 2, 1913.

3 SHEETS—SHEET 1.

WITNESSES:
Paul A. R. Kroesing, jr.
Lotta Lee Bray.

INVENTORS
George J. Baker
Frank E. Baker
BY
Ralzemond A. Parker
ATTORNEY

G. J. & F. E. BAKER.
CONTROL DEVICE.
APPLICATION FILED JUNE 20, 1912.
1,080,316.
Patented Dec. 2, 1913.
3 SHEETS—SHEET 2.
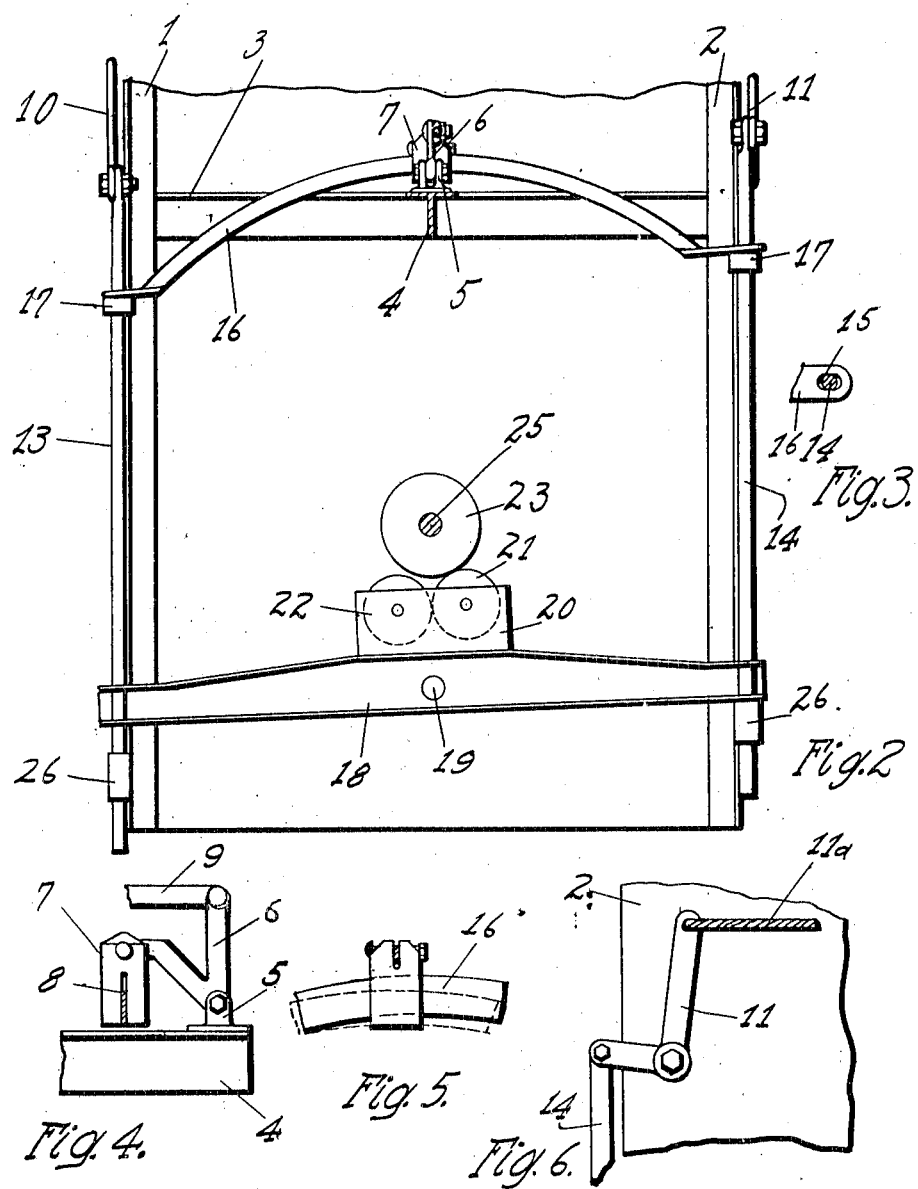
WITNESSES:
Paul O. R. Kroesing jr.
Lotta Lee Bray.
INVENTORS
George J. Baker
Frank E. Baker
BY
Raymond A. Parker
ATTORNEY

G. J. & F. E. BAKER.
CONTROL DEVICE.
APPLICATION FILED JUNE 20, 1912.

1,080,316.

Patented Dec. 2, 1913.
3 SHEETS—SHEET 3.

WITNESSES:
Paul A. R. Kroesing, Jr.
Lotta Lee Bray.

INVENTORS
George J. Baker
Frank E. Baker
BY
Raymond A. Parker
ATTORNEY

UNITED STATES PATENT OFFICE.

GEORGE J. BAKER AND FRANK E. BAKER, OF ROYAL OAK, MICHIGAN, ASSIGNORS OF ONE-HALF TO DETROIT TRACTOR COMPANY, OF DETROIT, MICHIGAN, A CORPORATION OF MICHIGAN.

CONTROL DEVICE.

1,080,316.  Specification of Letters Patent.  Patented Dec. 2, 1913.

Application filed June 20, 1912. Serial No. 704,772.

*To all whom it may concern:*

Be it known that we, GEORGE J. BAKER and FRANK E. BAKER, citizens of the United States, residing at Royal Oak, county of Oakland, State of Michigan, have invented a certain new and useful Improvement in Control Devices, and declare the following to be a full, clear, and exact description of the same, such as will enable others skilled in the art to which it pertains to make and use the same, reference being had to the accompanying drawings, which form a part of this specification.

This invention relates to control devices, especially, for tractors used in connection with farm machinery, so that the engine of the tractor may be controlled with a minimum number of reins, which pass back to the driver's seat on the farm implement.

It has for its object a control device capable of controlling three different devices with two reins or two levers.

A further object of this invention is a control device that not only controls a plurality of devices with a less number of reins, but also allows only a gradual opening of one of the devices, such as a throttle, and closes such device when a given kind of pull is exerted upon the reins. This will be more fully explained in the specification following. There is combined with this control device, a coöperating lever and rack bar with which one of the controlled devices can be gradually regulated.

This control device is, as stated, intended especially for use with tractors that draw farm implements and hence it is intended that the driver shall occupy the seat that it is customary to use on any farm implement drawn by horses. It is, of course, obvious that the lesser number of reins that the driver has to control, the more convenient will it be for him to operate the tractor and look after the work of the implement. We have shown our invention as controlling the steering and the throttle, but it is obvious that it can be used for other purposes of control.

Figures 7, 8, 9:
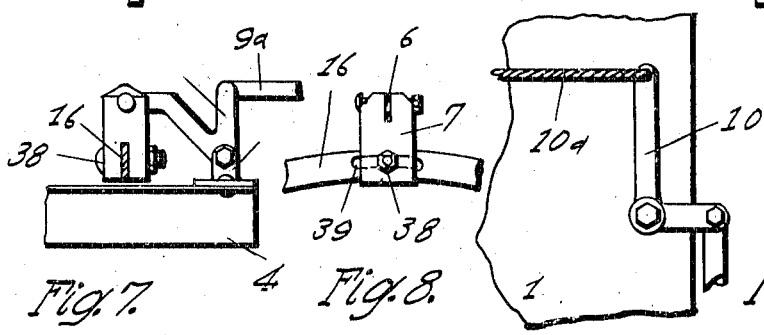
Figure 10:
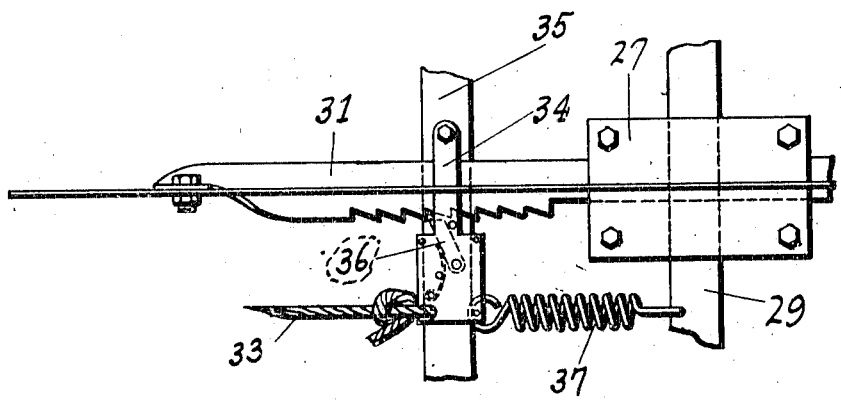
Figure 11:
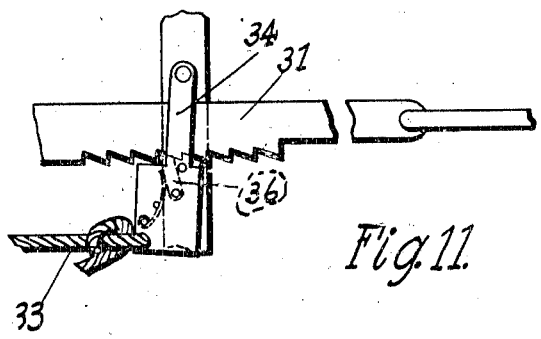
Figure 12:
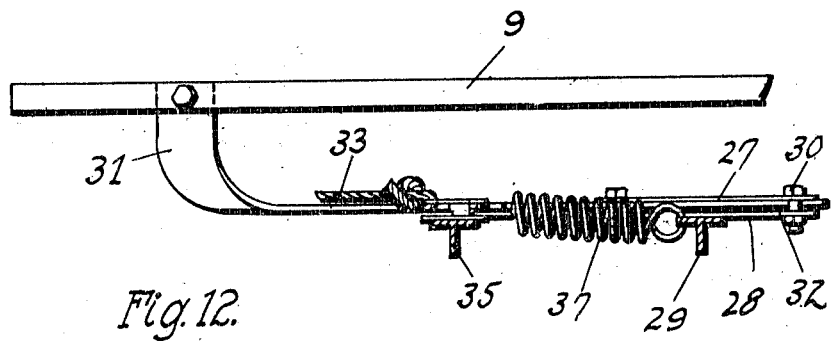

In the drawings:—Figure 1, is a front elevation of the control. Fig. 2, is a front elevation of the control, showing its position when draft has been exerted upon the rein at the right in this figure. Fig. 3, is a detail of the slotted terminals of the cross-bar. Fig. 4, is a detail of the slotted head and bell-crank lever that is put into operation by simultaneous draft on both reins. Fig. 5, is a detail showing how the cross bar may be oscillated in the slotted head without actuating the head. Fig. 6, is a detail of the bell-crank lever and rein, as shown at the right in Fig. 2. Fig. 7, is a view of the head and bell-crank lever when they are used to control a device which is intended to be pulled out of position only temporarily. Fig. 8, is a detail of the same view from the left in Fig. 7. Fig. 9, is a detail of the bell-crank lever at the left in Fig. 1, this lever being shown in position of rest. Fig. 10, is a plan view of the rack and lever control. Fig. 11, is a detail of the rack and lever control, showing the pawl moving the rack one notch. Fig. 12, is a side sectional elevation of the rack and lever.

1 and 2 are uprights connected by a cross bar 3 from whose center projects forward a bracket 4. Upon this bracket there is pivoted, by means of a superimposed bracket 5, a bell-crank lever 6. At one end of this bell-crank lever, a slotted head 7 is pivoted so that it depends downward and its slot 8 is disposed in a vertical position. At the opposite end of this bell-crank lever 6 is attached a link 9, whose office will appear later in this description. The link, bell-crank lever and slotted head form an additional control device which will be referred to for purposes of brevity as the extra control device. At each side on the uprights 1 and 2, respectively, are pivoted the bell-crank levers 10 and 11. The reins $10^a$ and $11^a$ are attached to the ends of these levers and may pass to any convenient point within reach of the driver. The rods 13 and 14 depend from the opposite end of the bell-crank levers 10 and 11, respectively, passing through slots 15 in the ends of the cross bar 16, as shown by the detail, Fig. 3. The collars 17 are arranged on the rods 13 and 14 so as to lie directly under the ends of the cross bar 16 that engage about these rods. The lower ends of the rods 13 and 14 pass through the oscillating cross-beam 18 that is pivoted and supported upon the shaft 19. Upon blocks 20, carried upon this cross-beam, are journaled a pair of friction wheels 21 and 22 in close proximity to the friction wheel 23 upon the drive-shaft 25. In the form of our invention here illustrated, these friction wheels are intended to operate the steering gear, being connected with a worm (not shown) that can drive a cross-rod connecting the steering knuckles of the wheels.

It will readily be understood that by bringing the friction wheel 21 into contact with the driving wheel 23 that this friction wheel 21 is given rotative movement, as well as the friction wheel 22, which is merely an idler and it will be understood that by bringing the wheel 22 into contact with the drive wheel 23 and taking the wheel 21 out of contact that the power will be transmitted through the idler 22 to the wheel 21 that will be driven in the direction opposite from the direction when it is being driven directly from the driving wheel 23. However, we do not intend to limit this control to steering gear for it might be used for change speed gear, or in other connections, nor do we intend to limit this control to friction wheels, because several well known forms of securing reversal of rotative movement might be used with very few modifications of our control.

When it is desired, for instance, to bring the friction wheel 21 into contact with the drive wheel 23, pull is exerted on the rein 11ᵃ, which raises the rod 14, as shown in Fig. 2, bringing the collar 17 into contact with the adjacent end of the cross bar 16 and the collar 26 that lies below the end of the cross beam 18, into contact with that end of the cross beam, thereby, swinging the cross beam about the pivot 19 until the friction wheel 21 comes in contact with the drive wheel 23; the cross bar 16 merely oscillates in the slot 8, assuming the position shown in the full lines of Fig. 5. Similarly pull on the rein 10ᵃ will cause the friction wheel 22 to come in contact with the drive wheel 23, thereby driving in the opposite direction the friction wheel 21, which is always in contact with the idler 22.

When pull is exerted simultaneously on both reins, the friction wheels will neither one of them contact the drive wheel 23, but remain in the position shown in Fig. 1, by reason of the lost motion on account of the position of the collar 26 somewhat below the cross beam, as indicated in Fig. 1, but the collars 17 will contact the ends of the cross bar 16 simultaneously and the cross bar will rise in the slot 8 carrying the head 7 upward and swinging the bell-crank 6, so that it pulls the link 9 to the right of the position shown in Fig. 3. Upon discontinuing the pull on the two reins, the cross bar drops to its initial position, while the bell-crank lever 6 remains in the position to which it has been put, by reason of a drag or frictional device contained between the plates 27 and 28 (Figs. 10 and 12,) that are supported on a cross bar 29 and that are bolted together by the bolts 30. Between these plates, the rack bar 31 is drawn back and forth over a strip of leather 32 which serves by reason of friction to keep the rack bar in any position to which it has been drawn. This rack bar curves up at the end, as shown in Figs. 9 and 10 and is bolted to the link 9. This frictional device, of course, keeps the bell-crank lever 6 in the position to which it has been thrown by the rise of the cross bars 16 when both reins are pulled.

The rack 31 is intended as a control for the throttle or for other devices which are required to be opened up, or closed slowly, and which could not be so operated by reins which must be pulled from a distance and upon which no one can tell just what amount of pull has been exerted. When the rein 33 is pulled, the lever 34, that is pivoted to the support 35, swings to the left, as shown in Fig. 10, thrusting the pawl 36 into the adjacent notch of the rack 31 and moves the rack just the length of one notch by reason of the lever being stopped when the pawl 36 cramps in the notch. The spring 37 returns the lever to its initial position where another pull upon the lever advances the rack 31 another notch and so on until the desired opening is accomplished.

When it is desired to return the rack to its extreme position to the right, as shown in Figs. 10 and 12, pull is exerted on both the reins which, as already explained, thrusts the lever 6 to the right in Fig. 4, and pulls the link 9.

In Figs. 7, 8, and 9 the extra control device shown in Figs. 4 and 5 is bolted to the cross bar 16 so that when pull is exerted on both reins, the bell-crank lever 6 is not only thrown upward, but when the pull is relieved, it drops back into its initial position with the cross bar 16. The bolt 38 passes through a slot 39 of the cross bar, so as to allow the cross bar to oscillate when only one of the reins is pulled. This arrangement is useful when it is desired to control a member only temporarily, as, for instance, to throw out a clutch that might be connected with the link 9ᵃ, thereby temporarily stopping the tractor.

What we claim is:—

1. A control, having in combination, a device, a movable member for controlling such device when the same is moved a prescribed distance, a second device, a second movable member for controlling such second device when the second movable member is moved a prescribed distance, a third device and an extra control device for controlling the third device, movable by simultaneous and conjointed actuation of the said first and second movable members short of the distance necessary to actuate the first or second device, substantially as described.

2. A control device, having in combination, a pair of movable rods, an oscillatory cross beam, a pair of members thereon by which two distinct devices may be controlled, an oscillatory cross bar connected with the said rods and a member upon which said cross bar can oscillate, but which is adapted to control a third device when said cross bar moves up and down, whereby actuation of either one of the rods oscillates the cross beam and operates either one or the other of the members on the cross beam, while simultaneous actuation of the rods operates the member connected with the cross bar, substantially as described.

3. A control device, having in combination, a pair of uprights, a bell crank lever pivoted to each upright and a movable rod connected with each bell-crank lever, a beam through which each rod passes, said beam having an oscillatory bearing, a cross bar through which each rod passes, a member through which said cross bar can oscillate, but which is actuated by the vertical movement of said cross bar, a pair of controlled members on said beam operable by the oscillation of the beam, whereby actuation of the one bell-crank lever or the other tips the beam and operates either one or the other of the control members as the case may be, while pull on both of the bell-crank levers simultaneously operates the said member in connection with the cross bar, substantially as described.

4. A control device, having in combination, a pair of movable rods, a cross beam connected with the rods and a cross bar connected with each rod, a pair of collars on each rod, one of each pair being below the cross bar and the other being below the cross beam, the said cross beam having a pivotal bearing, a pair of control members on said cross beam and an extra control device through which the cross bar may oscillate, but actuated by the vertical movement of the cross bar, whereby pull on either one of the rods tips the cross beam by reason of the collar thereunder, encountering the same and bringing into operation one of the control members, while simultaneous pull on both the rods brings the collars below the cross bar into contact with the cross bar and moves it vertically to actuate the extra control member, while the cross beam is not actuated by reason of the spacing of the collars therebelow at somewhat more distant points than the collars below the cross bars, substantially as described.

5. In a control device, a cross bar, a pair of rods reciprocable through said cross bar, a member through which said cross bar may oscillate when only one or the other of the rods is actuated, but which is brought into operation by the simultaneous actuation of both rods, the said member comprising a slotted head and pivoted bell-crank member, substantially as described.

6. A control device, having in combination, a pair of movable rods, a cross bar connected with the rods, a pivoted cross beam connected with the rods, a pair of wheels carried on said cross beam, a revolving wheel in proximity to both of said wheels of the cross beam, connections between said rods and cross bar and cross beam, whereby when a single rod is actuated the cross beam is tipped to bring one or the other of said wheels into engagement with the revolving wheel and an extra control member adapted to remain inactive during the oscillation of the cross bar, but actuated by the movement vertically of the cross bar due to the said connections and the rods being simultaneously actuated, substantially as described.

7. A control device, having in combination, a pair of movable rods, a cross bar connected with the rods and capable of oscillation and vertical movement, a cross beam having a pivotal bearing and connected with the said rods, connections between each of said rods and the cross beam and the cross bar arranged so that actuation of one only of either of the rods will tip the cross beam and cross bar, while actuation of both the rods will move the cross bar vertically, but will not actuate the cross beam, an extra control device remaining inactive during the oscillation of the cross bar, but put into operation by the vertical movement of the cross bar, a pair of wheels carried on said cross beam and a revolving wheel in proximity to said wheels, whereby oscillation of the cross beam brings either one or the other of said wheels into engagement with the revolving wheel, substantially as described.

8. A control device, having in combination, a pair of movable rods, a cross bar connected with the rods and capable of oscillation and vertical movement, a cross beam having a pivotal bearing and connected with the said rods, connections between each of said rods and the cross beam and the cross bar arranged so that actuation of one only of either of the rods will tip the cross beam and cross bar, while actuation of both the rods will move the cross bar vertically, but will not actuate the cross beam, an extra control device remaining inactive during the oscillation of the cross bar, but put into operation by the vertical movement of the cross bar, a pair of wheels carried on said cross beam and in engagement with each other, and a revolving wheel in proximity to said pair of engaging wheels, whereby tipping of the cross beam will bring either one or the other of the wheels into engagement with the revolving wheel and thereby secure reversal of movement of one of the wheels, substantially as described.

9. A control device, having in combination, a pair of control mechanisms for controlling separate devices, an extra control device operated by a particular kind of pull on the said pair of control mechanisms, a gradually operable control device, the said gradually operable control being returned to its initial position by operation of said extra control device, substantially as described.

10. A control device, having in combination, a pair of control mechanisms for controlling separate devices, a cross bar, an extra control device comprising a slotted head and bell-crank lever, whereby the cross bar may oscillate through the slotted head without actuating the same during the operation of either of the control mechanisms, but which is actuated by simultaneous actuation of the control mechanisms to raise the cross bar, a gradually operable control device for gradually controlling a member and a frictional or drag device for keeping the gradually operable control device in a given position, the said gradually operable control device being returned to its initial position by the operation of the extra control device, substantially as described.

11. A control device, operable by reins, comprising a pair of reins, separate control mechanisms operated by each of said reins, an extra control mechanism operated by simultaneous pull on both reins, a third control device operable by a third rein, said third control device being returned to initial position by the actuation of the extra control device, substantially as described.

12. A control device, operable by reins, having in combination, a pair of control mechanisms operable only by separate reins, an extra control device operable by simultaneous pull on both of said reins, a third control device arranged for gradual operation, and a third rein for actuating the same, the said third control device being returned to initial position by the said extra control device, substantially as described.

13. A control, having in combination, a pair of draft members, mechanism operated differently by independent pull on each draft member, lost motion connections between said draft members and the said mechanism for operating the latter, a cross bar connected with the draft members at each end, and an extra control device connected with the cross bar so that the cross bar swings or pivots inactively upon the extra control device when independent pull is exerted on either draft member, the said cross bar, however, being caused to travel within the limits allowed by the lost motion connections upon a simultaneous and conjoint pull upon both draft members and thereby actuate the extra control member, substantially as described.

In testimony whereof, we, sign this specification in the presence of two witnesses.

GEORGE J. BAKER.
FRANK E. BAKER.

Witnesses:
MAY J. BAKER,
CLARA C. RIES.